(No Model.)

R. M. HUNTER.
ELECTRIC RAILWAY.

No. 385,055. Patented June 26, 1888.

Attest
Henry Drury
E. M. Breckinred

Inventor
R. M. Hunter

UNITED STATES PATENT OFFICE.

RUDOLPH M. HUNTER, OF PHILADELPHIA, PENNSYLVANIA.

ELECTRIC RAILWAY.

SPECIFICATION forming part of Letters Patent No. 385,055, dated June 26, 1888.

Application filed February 24, 1888. Serial No. 265,174. (No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to electric railways and vehicles; and it consists in certain improvements fully set forth in the following specification and shown in the accompanying drawings, which form part thereof.

My invention has particular reference to the regulation of motors used in propelling vehicles, especially for railways; and in carrying out my invention I supply the current from any source to the motors and regulate its flow by means of a suitable switch, which couples the motors or coils thereof in such a way as to vary their internal resistance. The amount of current passing through the motors is regulated or controlled by varying the internal resistance of the motor—that is to say, by lengthening or shortening the length of the wire wound upon the motor and forming the coils thereof. The motor-resistance may be varied in various ways, a few examples being set out hereinafter; and hence I do not limit myself to any specific arrangement of coils on the motor or motors.

I do not confine myself to any form of overhead conductor or current-collector, as my invention is applicable to all forms of suspended conductors applied to an electric railway. It is also evident that while practice dictates that there should be two suspended conductors—one for positive and the other for negative current—it is not necessary to my invention that two such conductors be used, as one will suffice, so far as the broad spirit of my invention is concerned.

It is immaterial to my invention what the source of electric power may be, as the motors may be supplied with current from overhead conductors, as here shown, or any other type of line-conductors—for instance, as set out in my applications No. 171,625, of 1885, No. 200,400, of 1886, or No. 239,621, of 1887; or the source of electric supply may be batteries, as set out in my application No. 267,224, of 1888. The switch may be of any desired construction, and the motors may be supported by the vehicle and connected with the axles or driving-shaft in any suitable manner—as, for instance, as set out in my applications above referred to, or No. 215,199, of 1886, or No. 271,141, of 1888. It is also to be understood that so far as the regulation of the motors is concerned it is immaterial whether they are on a car, as they may be on a boat or any vehicle.

Figure 1:
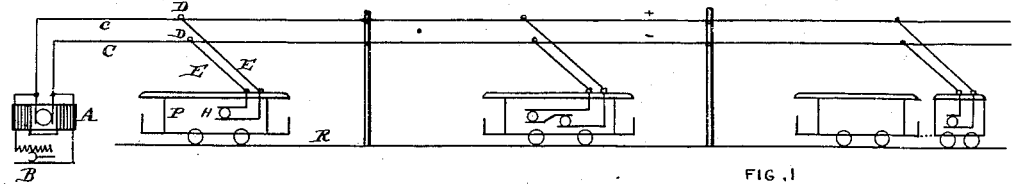
Figure 2:
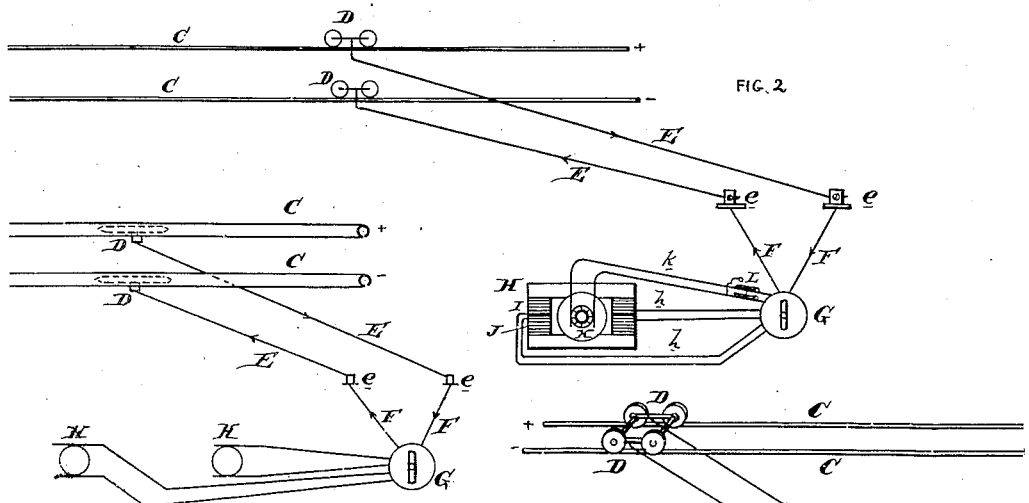
Figure 3:
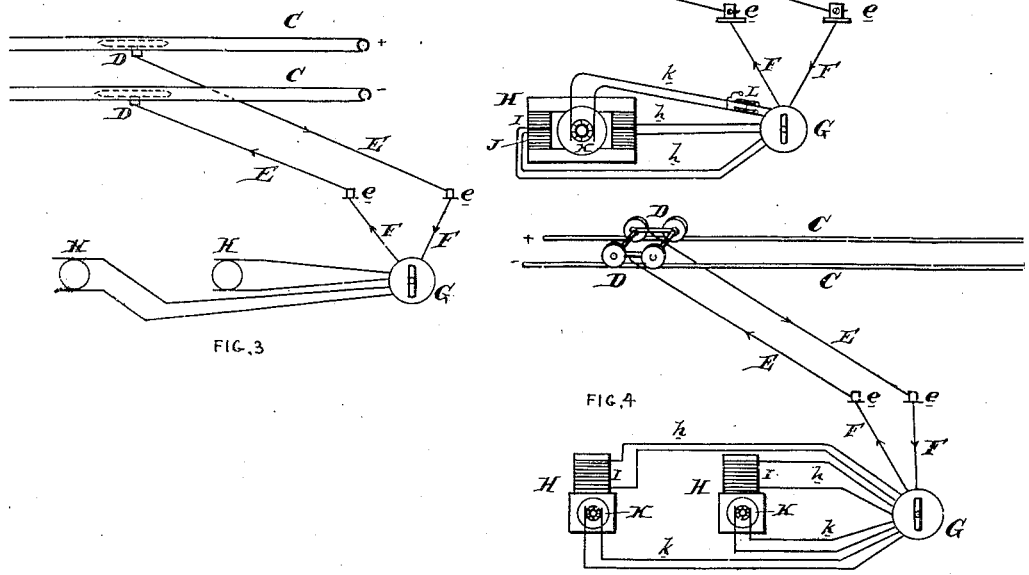
Figure 4:
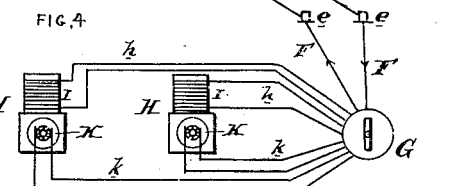
Figure 5:
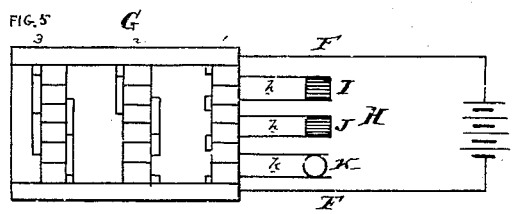
Figure 6:
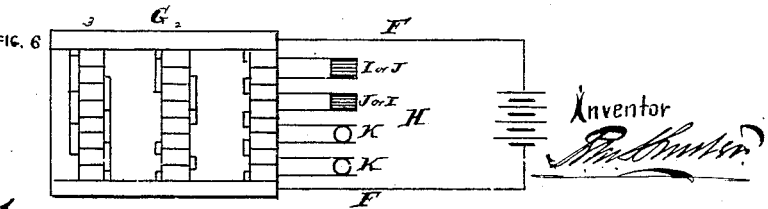

In the drawings, Figure 1 is a diagram illustrating an elevation of an electric railway using suspended working-conductors. Fig. 2 is a diagram of the electric circuits, showing the arrangement of collectors, switch, motor, and motor-circuits. Fig. 3 is a similar view showing the employment of two series motors. Fig. 4 is a similar view showing the same general invention with two motors adapted to be coupled in different ways, and in which the armature may be connected independently of the coils. Fig. 5 is a diagram of the switch for the circuits shown in Fig. 2, and Fig. 6 is a diagram of the form of switch adapted to the other constructions using two or more motors.

A is the generator at the central station, which is provided with a regulator, B, to control the current passing to the positive and negative conductors, C C, which are of any shape and suspended upon poles or otherwise.

In Figs. 1, 2, and 4 wires are used, and in Fig. 3 slotted tubes are shown.

P are the cars, which run upon a railway, R, parallel with the suspended conductors C C.

D D are the current-collectors, which may be made in any manner desired. In Figs. 1 and 2 they are shown as separate trolleys, in Fig. 4 as a single trolley, and in Fig. 3 as cylinders or pistons sliding through slotted tubes. From these collectors flexible collecting-conductors E E extend and lead to the castings or brackets *e e* on the car, preferably the forward end.

H are the motors which propel the cars, and they may be connected with the axles in any suitable manner.

G is the controlling-switch, which is preferably located at the forward part of the car, where the operator stands and receives the motor-circuits and conductors F F, leading from the brackets *e e* or the conductors E E. Where one motor only is used, I make the field-magnets with two or more coils, I J, each of which connects with contacts on the switch by circuits *h h*, and the armature K has its own circuit *k* also connecting with the switch. The conductors F are practically fixed and lead from the switch to a suitable position for connection with the flexible conductors E.

Referring now to Fig. 5, it will be observed that if the switch G be moved to position 1, as shown, then all of the field-coils and armature-coil are coupled in series, giving a great resistance. If turned to position 2, then the field-coils are coupled in parallel and in series with the armature, decreasing the total resistance and increasing the power of the field. If moved to the position 3, then all of the field-coils and armature are coupled in parallel with the smallest resistance. It is evident that this switch might be extended to cut out one field-coil, if so desired. Of course more than one such motor may be used, with a corresponding change in the switch, the particular form of which is no part of this invention. It will be observed that the full current is in the conductors C C; but only a regulated portion passes over the flexible conductors E and fixed conductors F, the amount of which is dependent upon the internal resistance of the motor.

In the case of the two series motors shown in Fig. 3 the switch would couple them in series or multiple to vary the resistance or might cut one motor out of circuit.

In Fig. 4 the two motors are formed with single field-coils, but with separate field-circuits *h* and armature-circuit *k* leading to the switch, and in this case the field-coils can be coupled with the armatures in series; but the field-coils may be coupled in parallel with themselves, as may also the armatures. Referring to Fig. 6, the position 1 of the switch shows the coils of both motors all in series. Position 2 would couple the field-coils in parallel and in series with the armatures, which latter would also be in series. Position 3 would couple all of the field-coils and armatures in parallel. It is evident that other combinations might also be made.

From the foregoing specification it will be evident that the various arrangements of the coils of the motors vary the power, speed, and torque and accomplish a full regulation. The armature-circuits *k* may have reversing-switches L, to reverse the current in them to run backward, and this would be a separate switch from G, and preferably independently controlled.

Any matters set out in this application but not claimed are not dedicated to the public, but form subject-matter of other applications. For instance, the suspended conductors with a traveling contact connecting with the electrically-propelled car is set out in my applications No. 214,309, of 1886, and No. 239,930, of 1887.

Having now described my invention, what I claim as new, and desire to secure by Letters Patent, is—

1. The combination of an electrically-propelled vehicle having two electric motors, a source of electric supply, and switches for coupling up the motors in series or multiple with the source of supply to vary the speed or power of the motors.

2. The combination of supply-conductors arranged parallel to a railway and adapted to supply positive and negative current, a moving collecting device or contact for each conductor, an electrically-propelled car or train of cars, two or more motors on said car or train to propel it, circuits including all of the coils of the motors and connecting with the collecting devices by conductors, and a switch in said circuits to vary the internal resistance of the motors as a unity by coupling their coils, so as to vary the length of wire of the coils in circuit, and consequently the resistance.

In testimony of which invention I hereunto set my hand.

RUDOLPH M. HUNTER.

Witnesses:
 E. M. BRECKINREED,
 ERNEST HOWARD HUNTER.